United States Patent [19]

Hill

[11] 4,182,601
[45] Jan. 8, 1980

[54] EXTRUSION APPARATUS
[75] Inventor: Alan H. Hill, Bury, England
[73] Assignee: The General Engineering Co. (Radcliffe) Limited, Bury, England
[21] Appl. No.: 919,904
[22] Filed: Jun. 28, 1978
[30] Foreign Application Priority Data
Aug. 20, 1977 [GB] United Kingdom ............... 35035/77
[51] Int. Cl.² .......................... B29F 3/04; B29F 3/10
[52] U.S. Cl. ............................ 425/97; 264/174; 425/133.1; 425/376 R; 425/466; 425/467
[58] Field of Search ................. 264/171–174; 425/97, 133.1, 376 R, 466, 467

[56] References Cited
U.S. PATENT DOCUMENTS

| | | | |
|---|---|---|---|
| 2,805,465 | 9/1957 | Miller | 264/171 |
| 3,110,059 | 11/1963 | Tallis et al. | 264/171 |
| 3,180,912 | 4/1965 | Rowe | 264/171 |
| 3,318,988 | 5/1967 | McDowell | 264/171 |
| 3,408,277 | 10/1968 | Martin et al. | 264/171 |
| 3,414,644 | 12/1968 | Myles et al. | 264/171 |
| 3,582,418 | 6/1971 | Schuur | 264/171 |
| 3,701,819 | 10/1972 | Yoshida et al. | 264/171 |
| 3,780,149 | 12/1973 | Keuchel et al. | 264/171 |
| 3,798,296 | 3/1974 | Thomas | 264/171 |

FOREIGN PATENT DOCUMENTS

| | | | |
|---|---|---|---|
| 1503084 | 11/1967 | France | 264/171 |
| 1087823 | 5/1964 | United Kingdom | 264/171 |
| 1167390 | 10/1969 | United Kingdom | 264/171 |

Primary Examiner—Jay H. Woo
Attorney, Agent, or Firm—Fleit & Jacobson

[57] ABSTRACT

This invention provides an apparatus for simultaneously producing, from a single source of homogenized plastics material, at least one product in which the plastics material is modified by the injection of an additive. The apparatus includes a mechanism, such as a screw extruder, for homogenizing the plastics material and a mechanism for dividing the stream of plastics material into at least two separate streams into one of which at least is injected an additive. The injection mechanism includes at least one hollow probe which terminates in the stream of plastics material to be modified and a dispersing mechanism for the additive, for example a gear pump, is provided. The streams of plastics material, modified and unmodified are then fed to a final product forming device, such as a die, in such manner that the streams can be individually extruded, or some at least of the streams can be combined in a die to produce an end product.

10 Claims, 7 Drawing Figures

EXTRUSION APPARATUS

This invention concerns an extrusion apparatus. More particularly the invention is concerned with the simultaneous production of extruded plastics materials exhibiting 'different characteristics'. The phrase different characteristics should, in this specification, be construed as meaning different physical and/or chemical characteristics. For example, differently coloured materials and materials having different densities are to be included, as are materials having different chemical characteristics caused, for example, by the addition to a basic plastics material of fire retardants, ultra violet light screening means, blowing agents and the like.

It is known, for instance, to be necessary to produce plastics extrusions having different physical characteristics. For example in the production of telecommunications cables and electrical cables for household, office and industrial wiring, colour coding is commonly used and for such cables differently coloured, and often multi-coloured insulation is used. It may also, from time to time, be necessary to incorporate additives which will reduce the sensitivity of the extruded material to the effects of ultra-violet light, fire or the like and furthermore in some instances a foaming (or blowing) agent may be called for.

It is known to produce a compound incorporating any additives that may be required to meet a particular users needs, such compound being produced before the ingredients are fed into a final extrusion apparatus.

It is also known to produce compounds in the final extrusion apparatus and there are several known methods of producing extrusions from the compounds so produced. For example, to produce extrusions in which a basic plastics material is modified by the incorporation of an additive it is common to use the so called master batch method in which a small quantity of plastics material including the additive is mixed, in an extruder, with a quantity of basic, plastics material. Alternatively an additive incorporated in a liquid carrier medium may be added at the feed end of an extruder to a quantity of basic plastics material. In a still further alternative a quantity of basic plastics material may be coated with a dry powdered additive prior to it being fed into an extruder. Additives such as colourants, fire retardants, ultraviolet light resistant agents and blowing agents may be added to a basic plastics material in any one of these methods.

The common element of all of the methods referred to above lies in the need to use a separate extruder for the production of each different extrusion material. In some cases the final product consists of an extrusion from a multi-part die head at which streams of different compounds each from its own extruder are combined to produce, for example, a striped insulation on an electrical wire, or, in fact, the product from each of a series of separate extruders is fed to its own die head to produce from each die a single colour insulation on an electrical wire. Alternatively the streams of homogenised plastics material from several extruders are fed, each to its own die head, successively arranged to produce an end product consisting of layers of plastics material in which, for example, the outermost is fire resistant or resistant to the effects of ultra-violet light, whereas an inner layer does not necessarily have any one of the aforementioned chemical characteristics. In some cases an end product having more than two layers is produced or alternatively the end product having more than two streams of different materials may be formed in such manner that the end product exhibits, for example, three or more differently coloured stripes on its external surface.

Methods of production necessitating the use of a multiplicity of extruders, have the disadvantage that the capital cost of equipment is high.

It is therefore an object of the present invention to provide an apparatus for simultaneous extrusion of plastics materials exhibiting different characteristics by the incorporation of an additive in liquid form or suspended in a liquid, which apparatus uses a single extruder for a basic plastics material.

A further object of the present invention is to provide an apparatus in which the simultaneous extrusion can be carried out with minimal risk of error.

Thus according to one aspect of the present invention the apparatus provides a method of simultaneously producing, from a single source of basic plastics material, a product or series of products including different forms of plastics material. The method using the apparatus includes the steps of feeding a basic plastics material through a screw extruder, dividing the stream of homogenised plastics material issuing from the extruder into a plurality of separate streams, injecting a predetermined quantity of a liquid additive incorporating a plastics material modifying agent into at least one stream of basic plastics material, controlling the flow of at least that stream of plastics material into which the modifying agent has been injected and dispersing the modifying agent or agents throughout their respective stream or streams of basic plastics material and feeding the various streams of plastics material to extruded product forming means.

According to a further aspect of the present invention the apparatus includes a screw extruder for homogenising a basic plastics material, a means for feeding the homogenised material to a manifold to produce a plurality of individual streams, there being an additive injecting means for feeding a predetermined quantity of liquid modifying agent into at least one stream of basic plastics material, means for controlling the flow of modified plastics material and dispersing the modifying agent therethrough, and extruded product forming means for the plastics material.

The invention will now be described further by way of example only with reference to several practical forms thereof and the accompanying diagrammatic drawings in which:

FIG. 1 shows a simple arrangement for producing two streams of plastics material having different characteristics;

FIGS. 1a, 1b, and 1c are enlarged cross-sectional views of some of the forms of extrusion that can be produced using the apparatus of FIG. 1;

Figure 1:
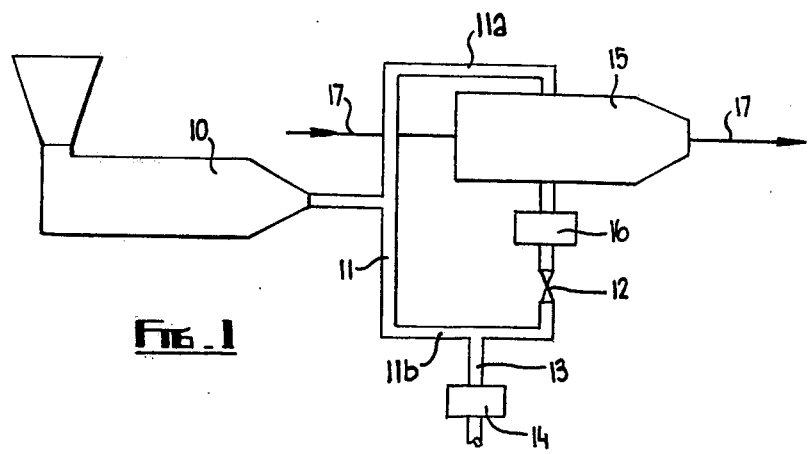

In the following description reference will be made to the use of the apparatus of FIG. 1 for the coating of an electrical wire with an insulating material in such a manner as to produce stripes of two colours longitudinally of the wire.

To produce the abovementioned effect in accordance with the invention an apparatus consisting of a single screw extruder 10 is provided for the production of a homogenised plastics material extrudate. At the outlet of the extruder is provided a manifold 11 which, in the particular apparatus being described, has two branches 11a and 11b. In a first branch 11b of the manifold there is provided a flow control device 12 which may take the form of a metering apparatus, such as a gear pump, or may consist of a restricter in the form of a valve. Between the device 12 and the extruder outlet is an inlet conduit 13 for the supply of a liquid additive. The inlet conduit 13 is provided with a metering means 14 for the liquid additive, such metering means 14 being conveniently in the form of a gear pump. Between the inlet conduit 13 and a die head 15 is provided a mixing means 16 which serves to ensure that the liquid additive is dispersed throughout the plastics material passing, in use, along the branch 11b of the manifold 11.

The second branch 11a of the manifold 11 is connected directly to the die 15. The die 15 is so constructed that a wire 17 to be coated can pass therethrough and so that at one position in the die 15 a first plastics material is applied to the wire 17. In the apparatus being described the first plastics material is that which passes directly from the extruder along the second branch 11a of the manifold 11. The plastics material applied to the wire 17 is therefore natural colour.

At a second position in the die 15 means is provided for applying the plastics material to which the liquid additive has been added. In this case the liquid additive would be coloured (for example green).

In use, plastics material from the extruder 10 passes in two streams to the die 15, one stream of plastics material, when it reaches the die being of a different form to the other in that it has been coloured. The resultant insulation on the wire 17 passing through the die 15 is multi-coloured and, if the plastics material is, in its uncoloured state, cream, the resultant coating is striped as shwon in FIG. 1a, the stripes being green and cream. By modifying the form of the die head 15 a layered extrusion, as shown in FIG. 1b can be produced.

It will be appreciated that the apparatus described above may be modified in many ways. For example, there may be provided flow control devices and liquid additive injecting means in both branches 11a, 11b of the manifold 11 in which case an original neutral coloured plastics material may be treated such that two differently coloured streams of plastics material are produced. It will also be appreciated that the metering of the liquid additive by means of apparatus other than a gear pump is possible, for example a reciprocating pump may be used. If desired, the apparatus which meters the plastic material may also serve to cause its mixing with the additive. It follows, therefore, that the possiblity exists of combining the functions of flow control device 12 and mixing means 16 in a single apparatus such as a gear pump.

More than two branches may be provided in the manifold 11 and if each branch has its own die 15 a multiplicity of wires 17, each one having a coating of differently coloured plastics insulation, may be produced simultaneously using plastics material from a single extruder 10. An example of an apparatus of this type in which only two branches from its manifold are shown for convenience is illustrated in FIG. 2. In this illustration elements identical to those shown in FIG. 1 have been given the same reference numerals. Thus it will be seen that the elements 12,13,14 and 16 are now also provided in branch 11a to feed the additional die head 15.

Figure 1A:
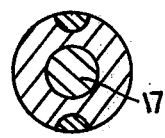
Figure 1B:
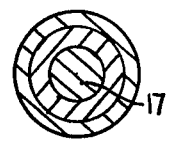
Figure 1C:
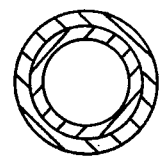
Figure 2:
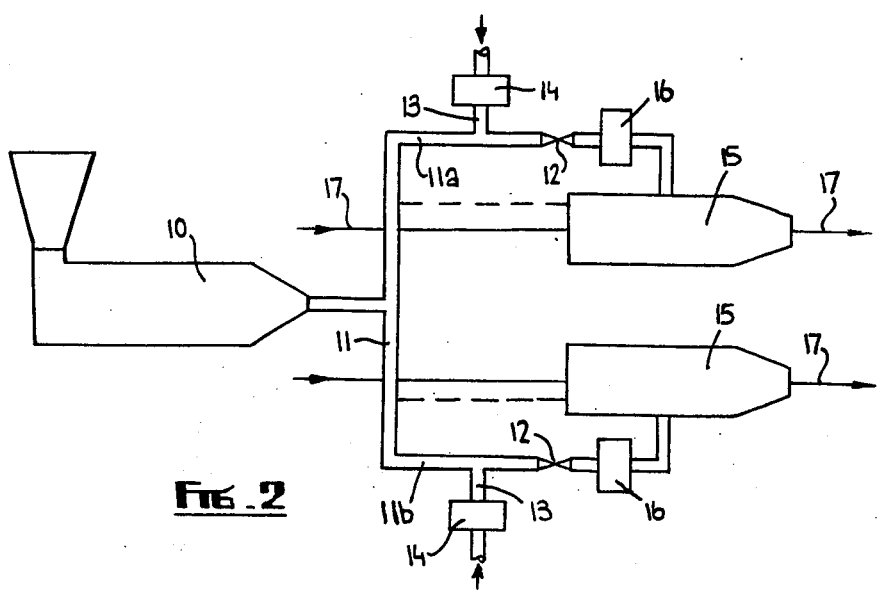
FIG. 2 is a view similar to FIG. 1 of a modification.

While the coating of wire has been referred to above in relation to the apparatus of FIG. 1 it should be appreciated that the invention can be applied to the production of extrusions other that for wire insulation. For example, tubular extrusions as shown for example in FIG. 1c can be produced. In this case a tube is produced, for example with an inner layer which is of natural plastics material and an outer layer which is coloured. Alternatively the plastics material of the outer layer may be modified chemically by the introduction, while part of the basic plastics material is passing down one branch of the manifold, to make it, for example, fire resistant. The extrusion of FIG. 1c can be produced using the apparatus of FIG. 1 with the provision of a suitable form of die head.

By providing the apparatus of FIG. 2 with, for example, a four branch manifold (the additional two branches being indicated by broken lines). Each of the additional branches can, of course, be provided with elements like those numbered 12, 13, 14 and 16 in which case each of the wires 17 could be provided with a striped covering of plastics material. Alternatively by changing the die heads 15 two tubular extrusions of the kind shown in FIG. 1c could be produced.

Figure 3:
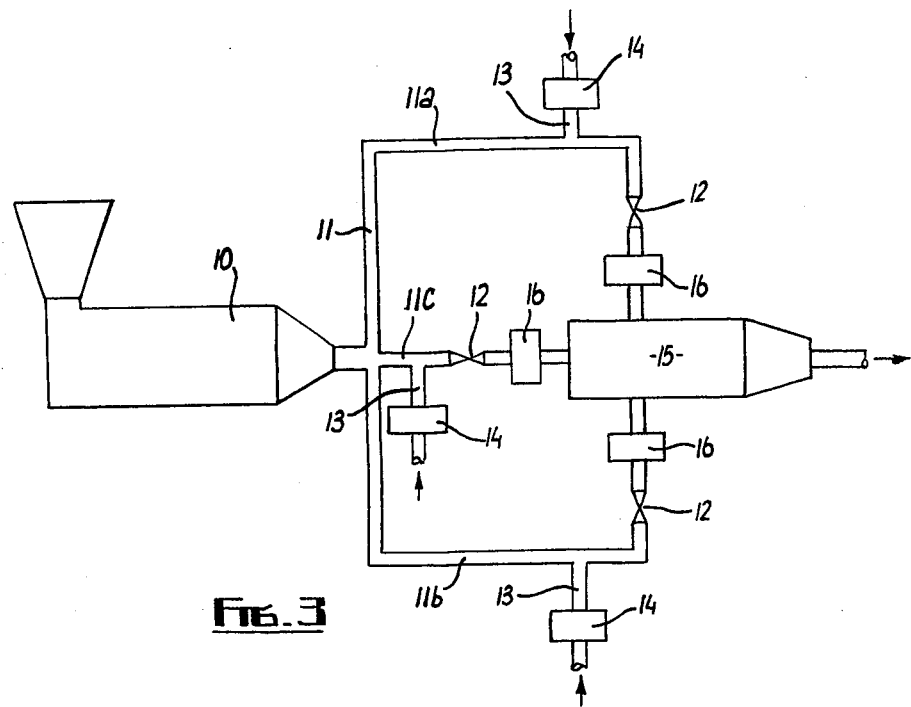
FIG. 3 shows a further modification.
Figure 3A:
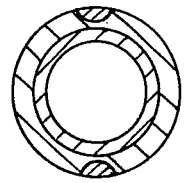
FIG. 3a is an enlarged cross-sectional view of one form of extrusion that can be produced using the apparatus of FIG. 3.

In order to produce a layered extrusion in which the outer layer itself has for example a colour coding formed by the production of a longitudinal stripe effect it is necessary as an absolute minimum to have three branches from the manifold. One form of such an apparatus is shown in FIG. 3 and as can be seen a common die head 15 is fed by branches 11a, 11b and 11c. Each branch has its own conduit 13 for the introduction of an additive and its own metering and dispersing device (these latter elements may, as stated above, be in the form of a gear pump). An end product capable of being extruded using the apparatus of FIG. 3 is shown in section in FIG. 3a. As can be seen there is provided an inner layer, and an outer layer which itself is formed from two different materials in that they are differently coloured. This composite outer layer may itself also possess different chemical characteristics, for example resistance to the effects of ultra-violet light. Alternatively one branch of the manifold may be connected directly to the die 15. In this case the directly connected branch of the manifold may serve either to supply unmodified basic plastics material for the outer layer, one of the other two branches will, in this case, supply modifed plastics material to the die to form the inner layer and the other to supply coloured plastics material to form the colour coding stripe, or stripes to the outer layer. Alternatively of course, the unmodified plastics material could be supplied to form the inner layer and the other two modified streams of material would be used to form the colour coded outer layer.

Of course a system is possible using any one of the apparatuses described above for having a stream of plastics material passing along a branch of the manifold, which may have more than one liquid additive, for example it may be coloured by one additive and rendered resistant to deterioration when subject to ultraviolet light by a second additive.

What we claim is:

1. An apparatus for producing insulated electrical conductor wire comprising a screw extruder for homogenising a basic plastics material, a manifold having at least two branches, means connected to an outlet of the extruder for feeding the basic plastics material to said manifold, liquid additive injecting means connected to at least one of said branches of said manifold for injecting liquid additive into the basic plastics material in said branch to cause initial dispersive mixing of the basic plastics material and the liquid additive, a control device adapted at least to control the flow of the basic plastics material and liquid additive, means for feeding the mixture of basic plastics material and liquid additive to said control device, means for completely dispersing the liquid additive through the basic plastics material to produce a homogenous stream of modified plastics material, a conductor covering die and means for feeding the modified plastics material to said conductor covering die to produce a covered electrical conductor.

2. An apparatus according to claim 1, in which said control device and said means for completely dispersing the liquid additive through the basic plastics material comprise a single element.

3. An apparatus according to claim 2, wherein said single element is a gear pump.

4. Apparatus as claimed in claim 1, in which the manifold is provided with two branches, one of which is connected directly to the conductor covering die to supply unmodified plastics material thereto.

5. Apparatus as claimed in claim 1, in which each branch of the manifold is provided with injecting means for an additive, flow control means and dispersing means, there being a conductor covering die common to all of the branches of the manifold.

6. Apparatus as claimed in claim 1, in which each branch of the manifold is provided with injecting means for an additive, flow conrrol means and dispersing means, there being a conductor covering die for each branch of the manifold.

7. Apparatus as claimed in claim 1, in which the injecting means includes a metering device for the additive.

8. Apparatus as claimed in claim 7 in which the metering device is a gear pump.

9. Apparatus as claimed in claim 1, in which the control device is a restrictor valve.

10. Apparatus as claimed in claim 1, in which the dispersing means is a gear pump.

* * * * *